(12) United States Patent
Ding et al.

(10) Patent No.: US 11,780,507 B2
(45) Date of Patent: Oct. 10, 2023

(54) COMPOSITE MATERIAL VEHICLE BODY AND COMPOSITE MATERIAL LAYING STRUCTURE AND LAYING METHOD

(71) Applicant: CRRC QINGDAO SIFANG CO., LTD., Qingdao (CN)

(72) Inventors: Sansan Ding, Qingdao (CN); Peng Xiao, Qingdao (CN); Yulong Gao, Qingdao (CN); Hongwei Zhao, Qingdao (CN); Peipei Wu, Qingdao (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 31 days.

(21) Appl. No.: 17/790,167

(22) PCT Filed: May 14, 2020

(86) PCT No.: PCT/CN2020/090174
§ 371 (c)(1),
(2) Date: Jun. 30, 2022

(87) PCT Pub. No.: WO2021/135034
PCT Pub. Date: Jul. 8, 2021

(65) Prior Publication Data
US 2023/0061523 A1 Mar. 2, 2023

(30) Foreign Application Priority Data
Jan. 2, 2020 (CN) .......................... 202010001475.8

(51) Int. Cl.
*B62D 25/00* (2006.01)
*B62D 29/04* (2006.01)
(Continued)

(52) U.S. Cl.
CPC .............. *B62D 29/043* (2013.01); *B29C 70/30* (2013.01); *B29K 2105/0845* (2013.01); *B29K 2307/04* (2013.01); *B62D 25/00* (2013.01)

(58) Field of Classification Search
CPC ..... B62D 25/00; B62D 25/20; B62D 25/2054; B62D 29/041; B62D 29/043; B29C 70/30; B29K 2105/0845; B29K 2307/04
See application file for complete search history.

(56) References Cited

U.S. PATENT DOCUMENTS 4,794,032 A * 12/1988 Fujii et al. ........... E04H 1/1261
105/396
4,966,082 A * 10/1990 Takeichi et al. .... E04B 1/34336
52/783.17
(Continued)

FOREIGN PATENT DOCUMENTS

CN 2723300 Y 9/2005
CN 103010316 A 4/2013
(Continued)

OTHER PUBLICATIONS

First Office Action dated Nov. 21, 2022 for Japanese patent application No.2022-539060, English translation provided by Global Dossier.
(Continued)

*Primary Examiner* — Gregory A Blankenship
(74) *Attorney, Agent, or Firm* — Yue (Robert) Xu; Apex Attorneys at Law, LLP

(57) ABSTRACT

A composite material laying structure, a composite material vehicle body, and a composite material laying method, the composite material laying structure comprising a profile provided with multiple quadrilateral cavities reinforced by lap joints after butt joint connection, the quadrilateral cavities comprising square cavities and profile cavities, and the square shape of the square cavities transitioning along the profile into the trapezoidal shape of the profile cavities. The present composite material laying structure employs the laying structure of the composite material profile and a butt joint lap-joint form.

7 Claims, 1 Drawing Sheet

(51) Int. Cl.
*B29C 70/30* (2006.01)
*B29K 105/08* (2006.01)
*B29K 307/04* (2006.01)

(56) References Cited

U.S. PATENT DOCUMENTS

| | | | | |
|---|---|---|---|---|
| 5,730,485 | A * | 3/1998 | Sjostedt et al. | B62D 25/2054 296/181.3 |
| 6,060,144 | A | 5/2000 | Kimura et al. | |
| 6,092,350 | A | 7/2000 | Dumlao et al. | |
| 7,128,365 | B2 | 10/2006 | Kiesewetter et al. | |
| 10,272,950 | B1* | 4/2019 | Smith, Jr. et al. | B62D 33/02 |
| 2008/0036240 | A1* | 2/2008 | Lusk et al. | B62D 27/026 296/178 |
| 2009/0028658 | A1* | 1/2009 | Adams | B62D 21/20 410/104 |
| 2009/0053458 | A1* | 2/2009 | Birrell | B62D 29/043 156/60 |
| 2015/0079314 | A1 | 3/2015 | McCarville et al. | |
| 2017/0088064 | A1* | 3/2017 | Pfaffelhuber | B62D 25/20 |
| 2017/0137066 | A1 | 5/2017 | Ayuzawa et al. | |
| 2019/0118924 | A1* | 4/2019 | Webb | B32B 3/30 |
| 2020/0047449 | A1* | 2/2020 | Ayuzawa | B62D 29/008 |
| 2020/0094449 | A1* | 3/2020 | Prinz et al. | B29C 44/14 |
| 2022/0410502 | A1* | 12/2022 | Imai et al. | B29C 70/40 |
| 2023/0040874 | A1* | 2/2023 | Imai et al. | B32B 5/12 |
| 2023/0061523 | A1* | 3/2023 | Ding et al. | B29C 70/16 |

FOREIGN PATENT DOCUMENTS

| | | |
|---|---|---|
| CN | 103692664 A | 4/2014 |
| CN | 107487038 A | 12/2017 |
| CN | 108979951 A | 12/2018 |
| CN | 209022981 U | 6/2019 |
| CN | 209426772 U | 9/2019 |
| CN | 110328871 A | 10/2019 |
| CN | 110435701 A | 11/2019 |
| CN | 111098939 A | 5/2020 |
| JP | 2000-263668 A | 9/2000 |
| JP | 2001071897 A | 3/2001 |
| WO | 2006/072758 A2 | 7/2006 |
| WO | 2015145891 A1 | 10/2015 |

OTHER PUBLICATIONS

International Search Report for PCT/CN2020/090174 mailed Sep. 23, 2020, ISA/CN.

\* cited by examiner

COMPOSITE MATERIAL VEHICLE BODY AND COMPOSITE MATERIAL LAYING STRUCTURE AND LAYING METHOD

This disclosure is a national phase application of PCT International Patent Application PCT/CN2020/090174, filed on May 14, 2020 which claims the priority to Chinese Patent Application No. 202010001475.8, titled "COMPOSITE MATERIAL VEHICLE BODY, COMPOSITE MATERIAL LAYING STRUCTURE AND LAYING METHOD", filed with the China National Intellectual Property Administration on Jan. 2, 2020, which is incorporated herein by reference in its entirety.

FIELD

The present disclosure relates to the technical field of composite material laying, and in particular to a composite material vehicle body. In particular, the present disclosure relates to a composite material laying structure. The present disclosure further relates to a composite material laying method.

BACKGROUND

A sandwich panel or a winding structure is generally used in a composite material vehicle body or an apron board structure, which cannot solve the problem of mechanical property reduction caused by butt connection of multi-axial cloth in a vertical pultrusion direction of a composite pultruded profile with a complex cross section.

In the first conventional technology, a load-bearing skeleton is made of fiber-reinforced resin matrix composite material coated on a foam inner core structure, and an inner panel is made of fiber-reinforced resin matrix composite material, and a part of an outer panel located on an inner surface is made of fiber-reinforced resin matrix composite material. In the second conventional technology, a sandwich structural form with a paper honeycomb core material filled between inner and outer carbon fiber skins is used in the vehicle body, the inner and outer skins of the vehicle body, including an intersecting area of a side wall and a roof of the vehicle body, are all formed by continuous laying of carbon fiber prepreg, and there is lapping area at an edge of each layer of the carbon fiber prepreg. None of the above conventional technologies has the design of a form of profile structure, which cannot solve the problem of mechanical property reduction caused by butt connection of multi-axial cloth in a vertical pultrusion direction of the composite pultruded profile with a complex cross section.

Therefore, how to provide a composite material laying structure with a laying design having a profile structure to solve the problem of mechanical property reduction caused by butt connection of the multi-axial cloth in the vertical pultrusion direction of the composite pultruded profile with the complex cross section is an urgent technical problem for those skilled in the art to solve.

SUMMARY

An object according to the present disclosure is to provide a composite material laying structure, which has a laying structure of composite material profile and a laying form in butt connection and lapping joint, and solves the problem of mechanical property reduction caused by butt connection of multi-axial cloth in a vertical pultrusion direction of the composite pultruded profile with a complex cross section. Another object according to the present disclosure is to provide a composite material vehicle body. Yet another objection according to the present disclosure is to provide a composite laying method.

In order to achieve the above objects, a composite material laying structure is provided according to the present disclosure, which includes a profile, the profile is provided with multiple quadrilateral chambers which are butt connected and then reinforced by lapping joint, the quadrilateral chambers includes square chambers and profile chambers, and the square chambers in a square shape are transitioned into the profile chambers in a trapezoidal shape along the profile.

Preferably, an outer surface of the profile is laid with multi-axial carbon fiber cloth.

Preferably, the multi-axial carbon fiber cloth is a bidirectional plain carbon fiber fabric or a bidirectional twill carbon fiber fabric or a patterned carbon fiber fabric or a fine woven fabric with an angle of ±45°.

Preferably, the multi-axial fiber cloth is the bidirectional plain carbon fiber fabric which has been treated with a thickening process.

Preferably, inner surfaces of the quadrilateral chambers are laid with multi-axial carbon fiber cloth.

Preferably, an interior of the profile is unidirectional carbon fiber wire.

Preferably, a seam for butt connection of the quadrilateral chambers and a reinforcing sheet for lapping joint of the quadrilateral chambers are located on lower surfaces of the quadrilateral chambers.

A composite material vehicle body is provided according to the present disclosure, having the above composite material laying structure.

A composite laying method is provided according to the present disclosure, for manufacturing the above composite material laying structure, which includes:

using a form of inner layers of the quadrilateral chambers with butt connection and lapping-joint reinforcement around inner chambers;

introducing a lapping-joint reinforcement layer before entering a forming mold; and transitioning the shape of the inner layers of the quadrilateral chambers from square into trapezoidal by using a multi-section transition mold.

Preferably, after the step of transitioning the shape of the inner layers of the quadrilateral chambers from square into trapezoidal by using a multi-section transition mold, the method further includes:

treating the plain carbon fiber fabric with a thickening process and laying the plain carbon fiber fabric on the outer surface of the profile.

Compared with the background technology, the composite material laying structure according to the present application includes the profile, the profile is provided with multiple quadrilateral chambers which are butt connected in sequences and then reinforced by lapping joint, the quadrilateral chambers include square chambers in a square shape and profile chambers in a trapezoidal shape, and the square chambers (101) in a square shape of the profile are transitioned into the profile chambers. The composite material laying structure forms the inner layers in the form of the profile structure by providing the multiple quadrilateral chambers that are butt connected and then reinforced by lapping joint, so as to provide the composite material profile that meets the mechanical property requirement of the vehicle body, and solve the problem of mechanical property reduction caused by butt connection of the multi-axial cloth in the vertical pultrusion direction of the composite pultruded profile with a complex cross section.

BRIEF DESCRIPTION OF THE DRAWINGS

For more clearly illustrating embodiments of the present application or technical solutions in the conventional technology, the drawings referred to for describing the embodiments or the conventional technology will be briefly described hereinafter. Apparently, the drawings in the following description are only some examples of the present application, and for those skilled in the art, other drawings may be obtained based on the provided drawings without any creative efforts.

Figure 1:
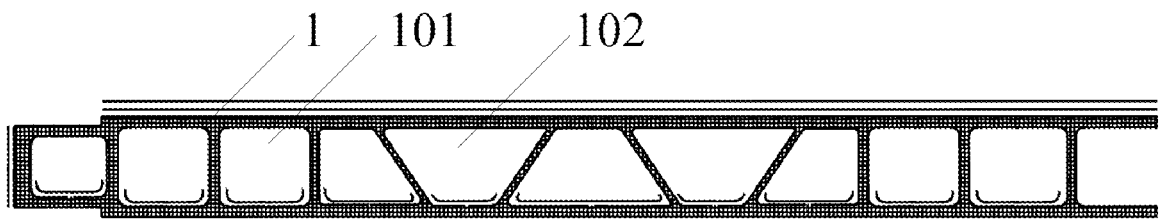
FIG. 1 is a schematic structural view of a composite material laying structure provided according to an embodiment of the present disclosure.

The reference numerals are as follows:

| 1 profile, | 101 square chamber, |
|---|---|
| 102 profile chamber. | |

DETAILED DESCRIPTION OF THE EMBODIMENTS

Technical solutions of embodiments of the present application are clearly and completely described hereinafter in conjunction with the drawings of the embodiments of the present application. Apparently, the embodiments described in the following are only some embodiments of the present application, rather than all embodiments. Based on the embodiments in the present application, all of other embodiments, made by the person skilled in the art without any creative efforts, fall into the scope of protection of the present application.

In order to enable those skilled in the art to better understand the solution of the present application, the present application will be further described in detail below with reference to the accompanying drawings and specific embodiments.

Figure 2:
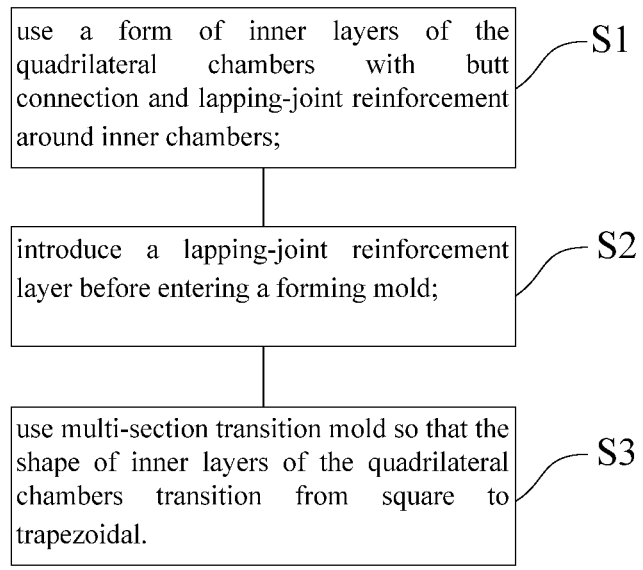
FIG. 2 is schematic flowchart of a composite material laying method provided according to the embodiment of the present disclosure.

Referring to FIG. 1 and FIG. 2, FIG. 1 is a schematic structural view of a composite material laying structure provided according to an embodiment of the present disclosure; and FIG. 2 is schematic flowchart of a composite material laying method provided according to the embodiment of the present disclosure.

In a first specific embodiment, a form of a profile structure is used in the composite material structure provided according to the present disclosure, an interior of the profile 1 includes multiple quadrilateral chambers reinforced by lapping joint after connected by butt connection, the quadrilateral chambers includes square chambers 101 and trapezoidal profile chambers 102, the quadrilateral chambers in the profile 1 in square shape is transitioned into the profile chambers 102 in trapezoidal shape.

In this embodiment, the composite material profile of this special design can meet the mechanical property requirement of the vehicle body, which can solve the problem of mechanical property reduction caused by butt connection of multi-axial cloth in a vertical pultrusion direction of the composite pultruded profile 1 with a complex cross section.

It should be noted that, the shape of the inner chamber layers is gradually transitioned from being straight to the shape of the profile chambers by using the design of a multi-section transition mold, and a lapping-joint reinforcement layer needs to be introduced before entering a forming mold. Specifically, the square shapes of the square shapes 101 are square and/or rectangle, and the trapezoidal shapes of the profile chambers 102 are isosceles trapezoid and/or right angle trapezoid. During the transition from the square chambers 101 to the profile chambers 102, firstly, multiple square shapes 101 at a first section are butted at right angle edges sequentially, and then the right angle edges of the square chambers 101 at an end of the first section are butted with right angle edges of the profile chambers 102 while the trapezoidal inclined edges of the multiple profile chambers 102 are butted with each other, the right angle edges of the profile chambers 102 at the end of the first section can continue to be butted with right angle edges of the profile chambers 102 at a head of a second section, and the multiple square chambers 101 at the second section continue to be connected sequentially. On this basis, a connection form of the first section and the second section of the above profile 1 can be repeatedly to form a profile 1 with more sections. In this profile 1, the square chambers 101 are spaced apart from the profile chambers 102, the square chambers 101 is transitioned into the profile chambers 102, and the shape of inner chamber layers of the profile 1 is gradually transitioned from being straight into the shape of the profile chambers.

In this embodiment, inner layers of the quadrilateral chambers are in a laying form with butt connection and lapping-joint reinforcement around inner chambers, a seam for butt connection of the quadrilateral chambers and a reinforcing sheet for lapping joint of the quadrilateral chambers are located on lower surfaces of the quadrilateral chambers, more specifically the seam for the butt connection after laid around the inner chambers is located at a corner of the lower surface of the chambers.

Besides, an outer surface of the profile 1 is laid with multi-axial carbon fiber cloth; inner surfaces of the profile chambers 102 are also laid with multi-axial carbon fiber cloth. In other words, inner surfaces of the quadrilateral chambers are laid with multi-axial carbon fiber cloth.

In this embodiment, the function of the multi-axial carbon fiber cloth is to provide shear resistance for the profile 1. In a case that the inner surface and the outer surface of the profile are laid with the multi-axial carbon fiber cloth, the inner surface and the outer surface of the profile 1, that is, the whole profile 1 has good shear resistance.

Exemplarily, an appearance surface layer of the profile 1 is laid by a bidirectional plain carbon fiber fabric. It should be noted that the appearance surface layer of the profile 1 includes but not limited to the bidirectional plain carbon fiber fabric, and may also be replaced with a bidirectional twill carbon fiber fabric or a patterned carbon fiber fabric or a fine woven fabric with an angle of ±45°, which should also belong to the description scope of this embodiment.

On this basis, the plain carbon fiber fabric on the outer surface of the profile 1 is treated by thickening; in the specific treatment process, the plain carbon fiber fabric is introduced by a pressing roller and is laid on the outer surface of the profile 1.

In addition, an interior of the profile 1 is unidirectional carbon fiber wire.

In this embodiment, the function of the unidirectional carbon fiber wire is to provide the profile 1 with bending resistance.

A composite material vehicle body having the above composite material laying structure is further provided according to the present disclosure, the composite material profile of the special design can meet the mechanical property requirement of the vehicle body, which can solve the problem of mechanical property reduction caused by butt connection of multi-axial cloth in a vertical pultrusion direction of the composite pultruded profile 1 with the complex cross section, improve the safety performance of the vehicle body, prolong the service life, and reduce the manufacturing cost, should have all the beneficial effects of the above composite material laying structure, and will not be repeated here.

A composite material laying method for manufacturing the above composite material laying structure is further provided according to the present disclosure, which includes: S1, using an inner laying form of the quadrilateral chambers with butt connection and lapping-joint reinforcement around inner chambers; S2, introducing a lapping-joint reinforcement layer before entering a forming mold; and S3, using a multi-section transition mold to transition the shape of the inner layers of the quadrilateral chambers from square to trapezoidal. The composite material laying structure manufactured based on the above composite material laying method has the form of the profile structure, and can meet the mechanical property requirement of the vehicle body, which can solve the problem of mechanical property reduction caused by butt connection of multi-axial cloth in a vertical pultrusion direction of the composite pultruded profile with the complex cross section.

In this embodiment, an inner layer of the profile 1 is formed by the quadrilateral chambers reinforced by lapping joint after butt connection sequentially, and the quadrilateral chambers in the profile 1 is gradually transitioned from the square chambers 101 in a square shape into the profile chambers 102 in a trapezoidal shape, the inner chamber layers are gradually transitioned from being straight into being with the shapes of the profile chambers by using the design of multi-section transition mold, and the lapping-joint reinforcement layer needs to be introduced before entering the forming mold.

In addition, after the step S3, the method further includes: S4, treating the plain carbon fiber fabric with a thickening process and laying the plain carbon fiber fabric on the outer surface of the profile 1.

In this embodiment, the plain carbon fiber fabric on the outer surface of the profile 1 is treated with a thickening process, and is introduced by the pressing roller and laid on the outer surface of the profile 1. The appearance surface layer of the profile 1 may be replaced by a bidirectional plain carbon fiber fabric into a bidirectional twill carbon fiber fabric or a patterned carbon fiber fabric or a fine woven fabric with an angle of ±45°.

Specific examples are used in this specification to illustrate the principle and implementation of the present application. The description of the above embodiments is only used to facilitate understanding of the method and core concept of the present application. It should be noted that, for those skilled in the art, many modifications and improvements may be made to the present disclosure without departing from the principle of the present application, and these modifications and improvements are also deemed to fall into the protection scope of the present application defined by the claims.

The invention claimed is:

1. A composite material laying structure, comprising a profile, wherein the profile is provided with a plurality of quadrilateral chambers which are butt connected and then reinforced by lapping joint, wherein the quadrilateral chambers comprise square chambers and profile chambers, and the square chambers in a square shape are transitioned into the profile chambers in a trapezoidal shape along the profile,
wherein an outer surface of the profile is laid with multi-axial carbon fiber cloth,
wherein inner surfaces of the quadrilateral chambers are laid with multi-axial carbon fiber cloth,
wherein a seam for butt connection of the quadrilateral chambers and a reinforcing sheet for lapping joint of the quadrilateral chambers are located on lower surfaces of the quadrilateral chambers,
wherein the quadrilateral chambers are in a laying form with butt connection and lapping-joint reinforcement around inner chambers,
during the transition from the square chambers to the profile chambers, firstly, a plurality of square shapes at a first section are butted at right angle edges sequentially, and then the right angle edges of the square chambers at an end of the first section are butted with right angle edges of the profile chambers while the trapezoidal inclined edges of a plurality of profile chambers are butted with each other, the right angle edges of the profile chambers at the end of the first section are continuously butted with right angle edges of the profile chambers at a head of a second section, and the plurality of square chambers at the second section continue to be connected sequentially so that a connection form of the first section and the second section is able to repeatedly form the profile with more sections.

2. The composite material laying structure according to claim 1, wherein the multi-axial carbon fiber cloth is a bidirectional plain carbon fiber fabric or a bidirectional twill carbon fiber fabric or a patterned carbon fiber fabric or a fine woven fabric with an angle of ±45°.

3. The composite material laying structure according to claim 2, wherein the multi-axial fiber cloth is the bidirectional plain carbon fiber fabric which has been treated with a thickening process.

4. The composite material laying structure according to claim 1, wherein an interior of the profile is unidirectional carbon fiber wire.

5. A composite material vehicle body, having the composite material laying structure according to claim 1.

6. A composite material laying method, for manufacturing the composite material laying structure according to claim 1, wherein the method comprises:
using a form of inner layers of the quadrilateral chambers with butt connection and lapping-joint reinforcement around inner chambers;
introducing a lapping-joint reinforcement layer before entering a forming mold; and
transitioning the shape of the inner layers of the quadrilateral chambers from square into trapezoidal by using a multi-section transition mold.

7. The composite material laying method according to claim 6, wherein after the step of transitioning the shape of the inner layers of the quadrilateral chambers from square into trapezoidal by using a multi-section transition mold, the method further comprises:
treating the plain carbon fiber fabric with a thickening process and laying the plain carbon fiber fabric on the outer surface of the profile.

* * * * *